United States Patent
Igarashi

(10) Patent No.: US 10,734,662 B2
(45) Date of Patent: Aug. 4, 2020

(54) FUEL CELL SYSTEM AND CONTROL METHOD THEREFOR

(71) Applicant: TOYOTA JIDOSHA KABUSHIKI KAISHA, Toyota-shi, Aichi-ken (JP)

(72) Inventor: Fusaki Igarashi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 290 days.

(21) Appl. No.: 15/694,234

(22) Filed: Sep. 1, 2017

(65) Prior Publication Data
US 2018/0108924 A1    Apr. 19, 2018

(30) Foreign Application Priority Data

Oct. 17, 2016  (JP) .................. 2016-203245

(51) Int. Cl.
*H01M 8/22* (2006.01)
*H01M 8/0432* (2016.01)
*H01M 8/04089* (2016.01)
*H01M 8/04746* (2016.01)

(52) U.S. Cl.
CPC ..... *H01M 8/04373* (2013.01); *H01M 8/0432* (2013.01); *H01M 8/04089* (2013.01); *H01M 8/04097* (2013.01); *H01M 8/04343* (2013.01); *H01M 8/04365* (2013.01); *H01M 8/04753* (2013.01); *H01M 8/04761* (2013.01)

(58) Field of Classification Search
CPC .................. H01M 8/04373; H01M 8/04089
See application file for complete search history.

(56) References Cited

U.S. PATENT DOCUMENTS

| 2009/0023020 A1* | 1/2009 | Hamada ............ H01M 8/04097 429/432 |
| 2009/0252997 A1 | 10/2009 | Katano et al. |
| 2016/0133960 A1 | 5/2016 | Yamamoto et al. |
| 2016/0141685 A1 | 5/2016 | Toida et al. |
| 2016/0146060 A1 | 5/2016 | Yamamoto et al. |

FOREIGN PATENT DOCUMENTS

| JP | 2007-207745 A | 8/2007 |
| JP | 2012-178353 A | 9/2012 |
| JP | 2012-178358 A | 9/2012 |
| JP | 2016-091971 A | 5/2016 |
| JP | 2016-095999 A | 5/2016 |
| JP | 2016-096072 A | 5/2016 |

* cited by examiner

Primary Examiner — Jane J Rhee
(74) Attorney, Agent, or Firm — Oliff PLC

(57) ABSTRACT

A controller of a fuel cell system, when the fuel cell system is started up and thrown into warming-up operation, sets a rotating speed of the circulation pump to a reference rotating speed, subsequently repeatedly performs: (a) a process of acquiring the first temperature and the second temperature; and (b) a process of controlling the circulation pump by setting the rotating speed of the circulation pump in order that with the first temperature is within a predetermined temperature range, the rotating speed is made generally higher than the reference rotating speed with increasing temperature difference between the first temperature and the second temperature, and when a condition for rotating the circulation pump at the reference rotating speed is satisfied, the controller sets the rotating speed of the circulation pump to the reference rotating speed.

8 Claims, 10 Drawing Sheets

FUEL CELL SYSTEM AND CONTROL METHOD THEREFOR

CROSS-REFERENCE TO RELATED APPLICATIONS

The present application claims priority from Japanese patent application 2016-203425 filed on Oct. 17, 2016, the content of which is hereby incorporated by reference into this application.

BACKGROUND

Field

The present disclosure relates to a fuel cell system and a control method therefore.

Related Art

As a conventional fuel cell system, there has been developed a fuel cell system in which, in terms of an anode gas supply system for supplying anode gas to an anode of a fuel cell (fuel cell stack), anode offgas that has not been consumed at the anode of the fuel cell is circulated to the anode gas supply system via a circulation pump included in an anode gas circulation system. Since the anode offgas contains moisture content of product water produced by fuel cell reactions, operating the fuel cell system for long periods may cause liquid water to reside in the anode gas circulation system (particularly, nearby the circulation pump). JP 2016-95999 A describes that liquid water residing in the anode gas circulation system is discharged by increasing the rotating speed of the circulation pump. It describes, that when the residing moisture content is decided to be above a specified value, the increasing rate of the rotating speed of the circulation pump is regulated.

The inventor of this application has found that during the course of starting up and warming up the fuel cell system, a large amount of condensed water is generated in the anode gas circulation system because of the low temperature of the circulation pump relative to the temperature of the anode offgas discharged from the fuel cell. Such condensed water is generated in larger quantities particularly when outside air temperature is low and temperature difference between the fuel cell and the circulation pump is large. Also, an attempt to discharge a large amount of condensed water by the circulation pump may cause unusual noise to occur to the circulation pump.

SUMMARY

The present invention, having been accomplished to solve the above-described problems, may be implemented in the following aspects.

According to one aspect of the disclosure, there is provided a fuel cell system. The fuel cell system comprises; a fuel cell; an anode gas supply flow path for supplying anode gas to the fuel cell; an anode gas discharge flow path for discharging anode offgas from the fuel cell; an anode gas circulation flow path for connecting the anode gas supply flow path and the anode gas discharge flow path to each other; a circulation pump provided on the anode gas circulation flow path to supply the anode offgas to the anode gas supply flow path; a first temperature sensor for measuring a temperature of the fuel cell as a first temperature; a second temperature sensor for measuring a temperature of the circulation pump as a second temperature; and a controller for controlling various devices of the fuel cell system. The controller is configured, when the fuel cell system is started up and thrown into warming-up operation, to set a rotating speed of the circulation pump to a reference rotating speed, subsequently repeatedly performs: (a) a process of acquiring the first temperature and the second temperature; and (b) a process of controlling the circulation pump by setting the rotating speed of the circulation pump in order that with the first temperature is within a predetermined temperature range, the rotating speed is made generally higher than the reference rotating speed with increasing temperature difference between the first temperature and the second temperature, and when a condition for rotating the circulation pump at the reference rotating speed is satisfied, to set the rotating speed of the circulation pump to the reference rotating speed.

When the fuel cell system is started up and thrown into warming-up operation, the fuel cell is warmed and anode offgas temperature is increased. The anode offgas, having reached the circulation pump, is cooled by the circulation pump so as to be condensed. Meanwhile, the circulation pump is warmed and increased in temperature by the anode offgas. Finally, the temperature of the anode offgas and the temperature of the circulation pump become generally equal to each other, causing no more condensations to occur in the circulation pump. Therefore, as the temperature of the anode offgas increases, the quantity of condensed water generated in the circulation pump increases. Thereafter, as the temperature of the circulation pump increases, temperature difference between the anode-offgas temperature and the circulation-pump temperature in turn decreases, so that the quantity of generated condensed water decreases. In this case, the quantity of generated condensed water becomes larger and larger with increasing temperature difference between a first temperature and a second temperature.

According to this aspect, when the fuel cell system is started up and thrown into warming-up operation, the rotating speed of the circulation pump is set to the reference rotating speed. Thereafter, the following processes are repeatedly executed, i.e., (a) a process of acquiring the first temperature and the second temperature; and (b) a process of controlling the circulation pump by setting the rotating speed of the circulation pump in order that with the first temperature is within a predetermined temperature range, the rotating speed is made generally higher than the reference rotating speed with increasing temperature difference between the first temperature and the second temperature. Thus, before a large quantity of condensed water is accumulated in the circulation pump, the circulation pump can be rotated at high rotating speed, water and steam can be discharged, and unusual noise can be made less likely to occur.

DESCRIPTION OF EMBODIMENTS

A. First Embodiment

Figure 1:
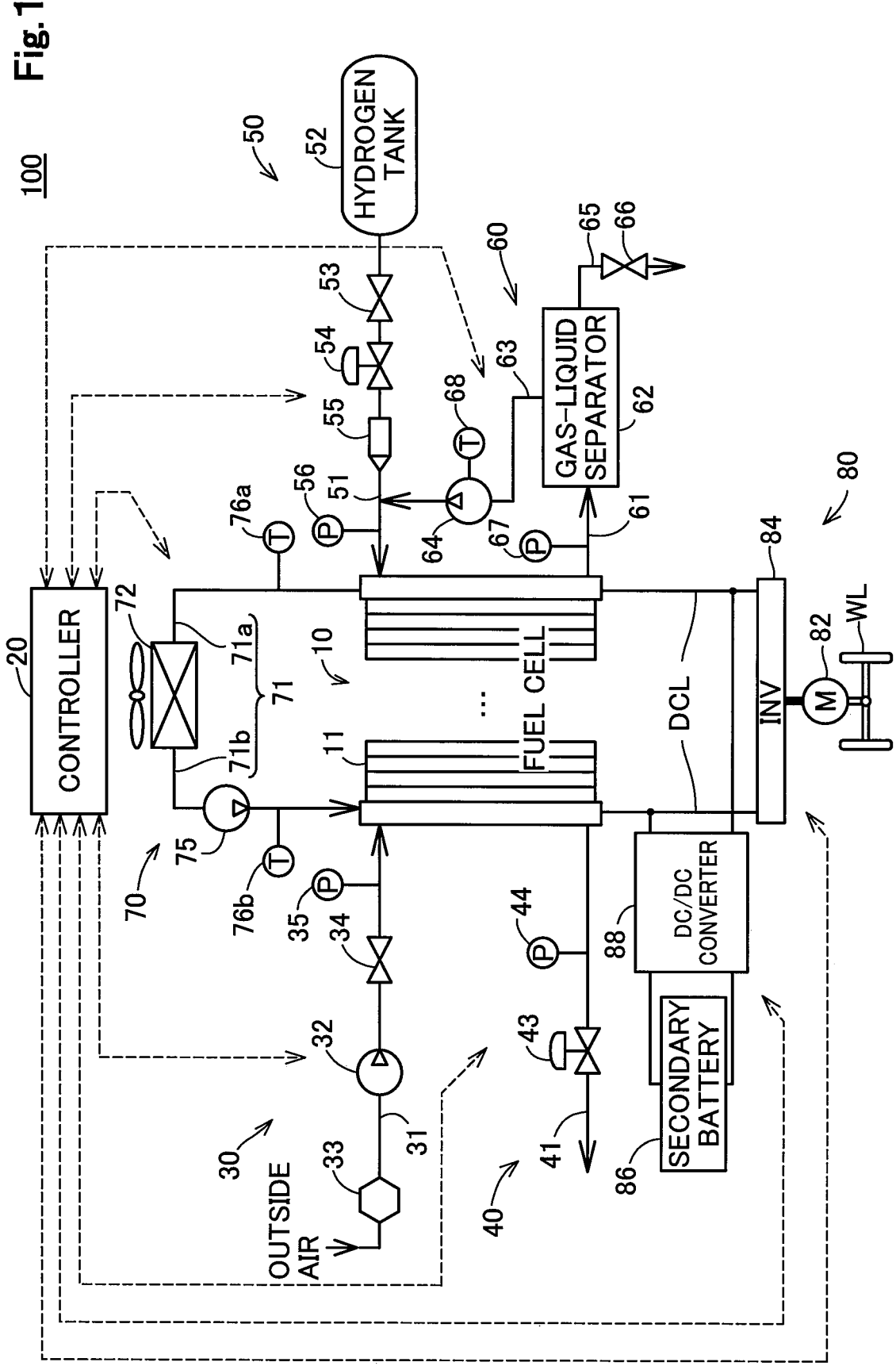
FIG. 1 is a schematic diagram showing a configuration of a fuel cell system as an embodiment of the present invention.

FIG. 1 is a schematic diagram showing a configuration of a fuel cell system 100 as an embodiment of the present invention. In this embodiment, the fuel cell system 100 is mounted on a vehicle (also referred to as 'fuel cell vehicle'). The fuel cell system 100 outputs electric power acting as power source for the vehicle in response to a request by accelerator (not shown) (hereinafter, also referred to as accelerator position) from a vehicle driver.

The fuel cell system 100 includes a fuel cell 10, a controller 20, a cathode gas supply system 30, a cathode gas discharge system 40, an anode gas supply system 50, an anode gas circulation system 60, a refrigerant circulation system 70, and a power charge/discharge system 80.

The fuel cell 10 is a solid polymer type fuel cell which generates electric power upon receiving supply of hydrogen as a fuel gas (also referred to as 'anode gas') and air (more strictly, oxygen) as an oxidizing gas (also referred to as 'cathode gas'). Hereinafter, anode gas and cathode gas will also be referred to collectively as 'reactant gas.' The fuel cell 10 has a stack structure in which a plurality of unit cells 11 are stacked in layers. In this embodiment, the fuel cell 10 is a so-called counterflow type fuel cell, in which anode gas and cathode gas flow in counter directions in opposition to each other. Generally, the fuel cell 10 is so positioned that anode gas flows from upper toward lower side along surfaces of the individual unit cells 11 while cathode gas flows from lower toward upper side. In addition, in the fuel cell 10, a manifold for reactant gases and the refrigerant is formed as through holes extending along the stacking direction, as it is omitted in the drawings.

Although not shown, each unit cell 11 has a fundamental structure in which an MEA (Membrane-Electrode Assembly) as a power generator is sandwiched between separators. The MEA is configured of a solid polymer type electrolyte membrane (also referred to simply as 'electrolyte membrane') formed of an ion exchange membrane, an anode composed of a catalyst layer and a gas diffusion layer formed on an anode-side surface of the electrolyte membrane, and a cathode composed of a catalyst layer and a gas diffusion layer formed on a cathode-side surface of the electrolyte membrane. Recessed gas flow paths that allow the anode gas and the cathode gas to flow therealong are formed on the surfaces in contact with the separators and the gas diffusion layers. Instead, gas flow paths may be provided separately between the separators and the gas diffusion layers.

The controller 20 is a control device for controlling individual devices and members forming the below-described cathode gas supply system 30, cathode gas discharge system 40, anode gas supply system 50, anode gas circulation system 60, and refrigerant circulation system 70 so as to allow the fuel cell 10 to generate power responsive to an output request from the external to the system. The controller 20 is enabled to execute software corresponding to various types of control by using a microcomputer including, e.g., CPU, ROM, RAM and the like so as to implement, in software-like configuration, an overall controller, a cathode gas controller for controlling the cathode gas supply system 30 and the cathode gas discharge system 40, an anode gas controller for controlling the anode gas supply system 50 and the anode gas circulation system 60, a refrigerant controller for controlling the refrigerant circulation system 70, and the like.

The cathode gas supply system 30 includes cathode gas piping 31, an air compressor 32, an air flow meter 33, an opening/closing valve 34, and a pressure measuring part 35. The cathode gas piping 31 is piping connected to a cathode-side supply manifold of the fuel cell 10.

The air compressor 32 is connected to the fuel cell 10 via the cathode gas piping 31. The air compressor 32 captures and compresses air from outside air to supply the compressed air as a cathode gas to the fuel cell 10. The air flow meter 33 measures, and transmits the measured value to the controller 20, an amount of outside air captured by the air compressor 32 on the upstream side of the air compressor 32. Based on the measured value, the controller 20 drives the air compressor 32 to control the supply amount of air for the fuel cell 10.

The opening/closing valve 34 is provided between the air compressor 32 and the fuel cell 10. The opening/closing valve 34, which is normally closed, is opened when air having a specified pressure is supplied from the air compressor 32 to the cathode gas piping 31. The pressure measuring part 35 measures, and outputs the measured value to the controller 20, a pressure of air supplied from the air compressor 32 at nearby an inlet of the cathode-side supply manifold of the fuel cell 10.

The cathode gas discharge system 40 includes cathode exhaust gas piping 41, a pressure regulating valve 43, and a pressure measuring part 44. The cathode exhaust gas piping 41 is piping connected to the cathode-side discharge manifold of the fuel cell 10. The cathode exhaust gas (also referred to as 'cathode offgas') is discharged via the cathode exhaust gas piping 41 outside the fuel cell system 100.

The pressure regulating valve 43 is controlled in degree of openness by the controller 20 to regulate the pressure of the cathode exhaust gas (cathode-side back pressure of the fuel cell 10) in the cathode exhaust gas piping 41. The pressure measuring part 44 is provided upstream of the pressure regulating valve 43 to measure the pressure of the cathode exhaust gas, outputting a measurement result to the controller 20. The controller 20 regulates the openness of the pressure regulating valve 43 based on the measured value of the pressure measuring part 44 to control the pressure of air supplied to the fuel cell 10.

The anode gas supply system 50 includes anode gas piping 51, a hydrogen tank 52, an opening/closing valve 53, a regulator 54, a hydrogen supply unit 55, and a pressure measuring part 56. The hydrogen tank 52 is connected to an inlet of the anode-side supply manifold (not shown) of the fuel cell 10 via the anode gas piping 51 to supply hydrogen filled in the tank to the fuel cell 10. It is noted that the anode gas piping 51 corresponds to 'anode gas supply flow path' of the invention.

The opening/closing valve 53, the regulator 54, the hydrogen supply unit 55, and the pressure measuring part 56 are provided on the anode gas piping 51, in this order from the upstream side (hydrogen tank 52 side). The opening/closing valve 53 is opened/closed by a command from the controller 20 to control inflow of hydrogen from the hydrogen tank 52 to the upstream side of the hydrogen supply unit 55. The regulator 54 is a pressure reducing valve for regulating the pressure of hydrogen on the upstream side of the hydrogen supply unit 55, the openness of the valve being controlled by the controller 20.

The hydrogen supply unit 55 may be formed of, for example, an injector which is an electromagnetically driven opening/closing valve. The pressure measuring part 56 measures, and transmits the measured value to the controller 20, a pressure of hydrogen on the downstream side of the hydrogen supply unit 55. The controller 20 controls the hydrogen supply unit 55 based on the measured value of the pressure measuring part 56 to control the flow rate of hydrogen supplied to the fuel cell 10.

The anode gas circulation system 60 includes anode exhaust gas piping 61, a gas-liquid separator 62, anode gas circulation piping 63, a circulation pump 64, anode drain piping 65, a drain valve 66, a pressure measuring part 67, and a pump temperature sensor 68. The anode gas circulation system 60 performs circulation and discharge of anode exhaust gas (also referred to as 'anode offgas') containing unreacted gases (hydrogen, nitrogen, etc.) and drain water discharged from the anode of the fuel cell 10 without being used for power generation reactions.

The anode exhaust gas piping 61 is piping for connecting the gas-liquid separator 62 and an outlet of the anode-side discharge manifold (not shown) of the fuel cell 10 to each other. The gas-liquid separator 62 is connected to the anode gas circulation piping 63 and the anode drain piping 65. The gas-liquid separator 62 separates gaseous components and water content contained in the anode exhaust gas, introducing the gaseous components to the anode gas circulation piping 63 while introducing the water content to the anode drain piping 65. It is noted that the anode exhaust gas piping 61 corresponds to 'anode gas discharge flow path' of the invention.

The anode gas circulation piping 63 is connected to a point of the anode gas piping 51 downstream of the hydrogen supply unit 55. A circulation pump 64 is provided on the anode gas circulation piping 63. Hydrogen contained in the gaseous components separated in the gas-liquid separator 62 is fed out onto the anode gas piping 51 by the circulation pump 64 so as to be recycled as anode gas. It is noted that the anode gas circulation piping 63 corresponds to 'anode gas circulation flow path' of the invention.

The anode drain piping 65 is piping for discharging water content separated in the gas-liquid separator 62 outside the fuel cell system 100. A drain valve 66 is provided on the anode drain piping 65. The controller 20, keeping the drain valve 66 normally closed, opens the drain valve 66 at a preset specified drainage timing or a discharge timing of inert gas in the anode exhaust gas.

The pressure measuring part 67 of the anode gas circulation system 60 is provided on the anode exhaust gas piping 61. The pressure measuring part 67 measures, and transmits the measured value to the controller 20, a pressure of the anode exhaust gas (an anode-side back pressure of the fuel cell 10) at a point nearby an outlet of the hydrogen manifold of the fuel cell 10. The controller 20 controls the supply of hydrogen to the fuel cell 10 on the basis of a measured value of the pressure measuring part 67 in the anode gas circulation system 60 as well as a measured value of the pressure measuring part 56 in the above-described anode gas supply system 50.

The pump temperature sensor 68 measures, and transmits the measured value to the controller 20, a temperature of the casing of the circulation pump 64. The controller 20 controls the rotating speed of the circulation pump 64, as will be described later, on the basis of measured values by the pump temperature sensor 68 and a later-described FC outlet temperature sensor 76a. The pump temperature sensor 68 corresponds to the second temperature sensor.

The refrigerant circulation system 70 includes refrigerant piping 71, a radiator 72, and a refrigerant circulation pump 75. The refrigerant piping 71 includes upstream-side piping 71a on the upstream side of the radiator 72, and downstream-side piping 71b on its downstream side. The upstream-side piping 71a connects an inlet of the radiator 72 and an outlet of the refrigerant discharge manifold (not shown) of the fuel cell 10 to each other. The downstream-side piping 71b connects an outlet of the radiator 72 and an inlet of the refrigerant supply manifold (not shown) of the fuel cell 10 to each other.

The radiator 72 cools the refrigerant by exchanging heat between the refrigerant flowing through the refrigerant piping 71 and the outside air. The refrigerant circulation pump 75 is provided midway on the downstream-side piping 71b to feed out the refrigerant cooled in the radiator 72 toward the fuel cell 10. The FC outlet temperature sensor 76a is provided on the upstream-side piping 71a, while an FC inlet temperature sensor 76b is provided on the downstream-side piping 71b. The FC outlet temperature sensor 76a and the FC inlet temperature sensor 76b transmit measured temperatures of the refrigerant, respectively, to the controller 20. The controller 20 controls operation of the radiator 72 on a basis of the measured values (refrigerant temperatures) by the FC outlet temperature sensor 76a and the FC inlet temperature sensor 76b.

The power charge/discharge system 80 includes a drive motor 82 as a load device, an inverter (INV) 84, a secondary battery 86, and a DC/DC converter 88. The fuel cell 10 is electrically connected to the inverter 84 via DC lines DCL, while the secondary battery 86 is electrically connected to the DC lines DCL via the DC/DC converter 88.

The secondary battery 86 is charged with output power of the fuel cell 10 and regenerative power of the drive motor 82 to function as a power source together with the fuel cell 10. The secondary battery 86 may be provided as a lithium ion battery as an example.

Based on commands from the controller 20, the DC/DC converter 88 controls current and voltage of the fuel cell 10 while controlling charge and discharge of the secondary battery 86 to variably regulate the voltage level of the DC lines DCL. The inverter 84 converts DC power derived from the fuel cell 10 and the secondary battery 86 into AC power, and supplies the AC power to the drive motor 82. The drive motor 82 drives wheels WL connected thereto via gears or the like in response to power supplied from the inverter 84 in correspondence to the accelerator position. When regenerative power is generated by the drive motor 82, the inverter 84 converts the regenerative power into DC power to electrically charge the secondary battery 86 via the DC/DC converter 88.

The above-described fuel cell system 100 is enabled to output, from the fuel cell 10, electric power acting as the power source of the vehicle in correspondence to the accelerator position while the cathode gas supply system 30 as well as the cathode gas discharge system 40, the anode gas supply system 50 as well as the anode gas circulation system 60, and the power charge/discharge system 80 are controlled by the controller 20. Below described is processing for increasing the rotating speed of the circulation pump 64 to increase the circulation amount of the anode gas (hydrogen) by the anode gas circulation system 60 during the operation of the fuel cell system 100.

Figure 2:
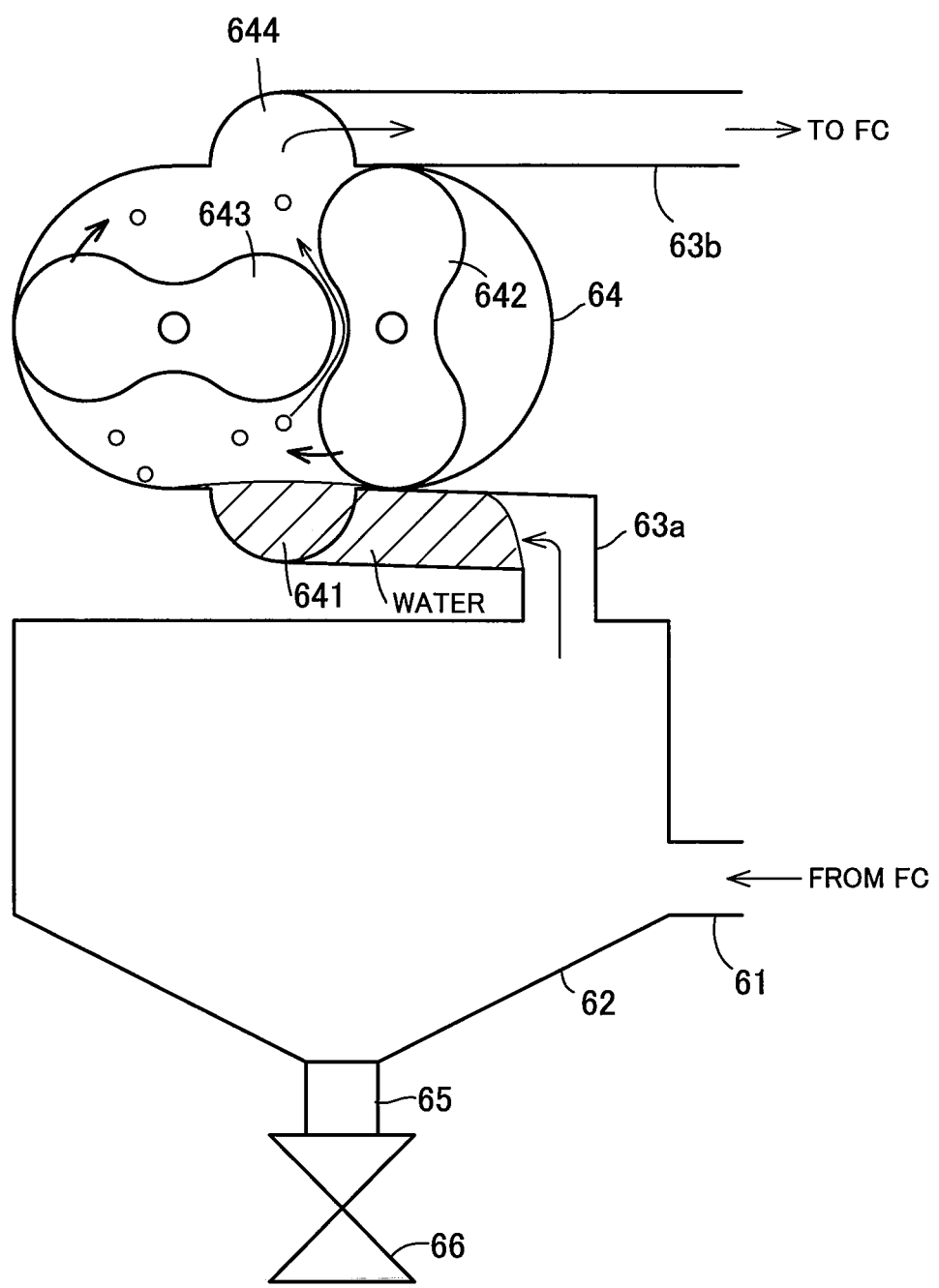
FIG. 2 is an explanatory view showing, under enlargement, the circulation pump and the gas-liquid separator in the anode gas circulation system.

FIG. 2 is an explanatory view showing, under enlargement, the circulation pump 64 and the gas-liquid separator 62 in the anode gas circulation system 60. The circulation pump 64, which is a Roots vacuum pump, includes an inlet port 641, impellers 642, 643, and an outlet port 644. The anode exhaust gas piping 61 connected to an outlet of the anode-side discharge manifold (not shown) located in lower part of the fuel cell 10 is connected to lower part of the gas-liquid separator 62. First anode gas circulation piping 63a connected to vertically upper part of the gas-liquid separator 62 is connected to the inlet port 641 which is a vertically lower part of the circulation pump 64. Second anode gas circulation piping 63b connected to the outlet port 644 in upper part of the circulation pump 64 is coupled to the anode gas piping 51 (FIG. 1) and moreover connected to the inlet of the anode-side supply manifold (not shown) located in upper part of the fuel cell 10. That is, the circulation pump 64 is so positioned that hydrogen sucked in through the lower-positioned inlet port 641 is fed out through the upper-positioned outlet port 644.

After start-up of the fuel cell system 100, particularly during warming-up operation, the circulation pump 64 has not yet been warmed. In this state, given a flow of warm, wet anode offgas discharged and coming up from the fuel cell 10, steam in the anode offgas is condensed within the circulation pump 64, so that water is accumulated in the circulation pump 64. Then, depending on the quantity of water within the circulation pump 64, water may bite the impellers 642, 643, causing unusual noise to occur. In such a case, increasing the rotating speed of the circulation pump 64 so as to discharge the water generated due to steam in the anode offgas or condensations allows the water within the circulation pump 64 to decrease, so that unusual noise becomes less likely to occur.

Figure 3:
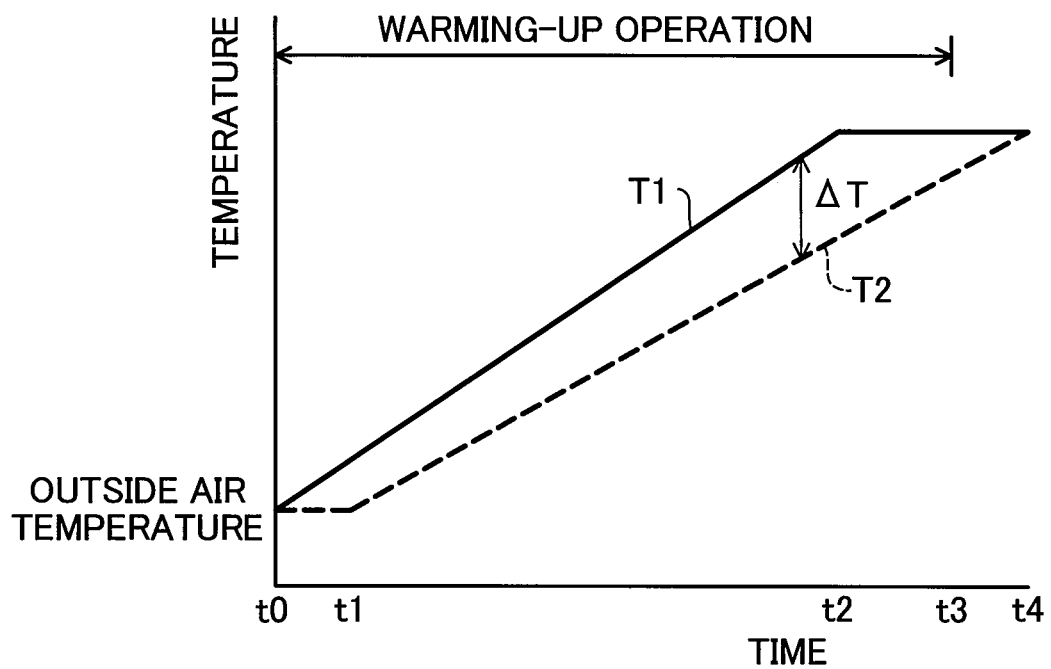
FIG. 3 is a graph showing an example of variations in first temperature of the fuel cell and second temperature of the circulation pump after start-up of the fuel cell system.

FIG. 3 is a graph showing an example of variations in first temperature T1 of the fuel cell 10 and second temperature T2 of the circulation pump 64 after start-up of the fuel cell system 100. The first temperature T1 of the fuel cell 10 is measured by the FC outlet temperature sensor 76a. In this case, the first temperature T1 of the fuel cell 10 may be considered as generally equal to the temperature of the refrigerant discharged from the fuel cell 10. The FC outlet temperature sensor 76a corresponds to the first temperature sensor for measuring the temperature of the fuel cell 10. The first temperature sensor has only to be capable of directly or indirectly measuring the temperature of the fuel cell 10, so that the first temperature sensor may be provided at a site other than on the upstream-side piping 71a of the refrigerant circulation system 70 (e.g., a site on the fuel cell 10 itself). After the fuel cell system 100 is started up at t0, the first temperature T1 of the fuel cell 10 goes higher due to heat generated by electrochemical reactions. In addition, since the fuel cell 10 is cooled by the refrigerant circulation system 70, the first temperature T1 does not increase over a certain temperature. In the example shown in FIG. 3, the first temperature T1 keeps generally equal from time t2 onward.

After the anode offgas discharged from the fuel cell 10 has reached the circulation pump 64, the anode offgas warms the circulation pump 64, so that the second temperature T2 of the circulation pump 64 increases. The second temperature T2 of the circulation pump 64 increases from time t1 onward with a slight delay from when the first temperature T1 of the fuel cell 10 increases. It is noted that the second temperature T2 of the circulation pump 64, after having become generally equal to the temperature of the anode offgas, does not increase any more. In this embodiment, at time t4, the second temperature T2 of the circulation pump 64 becomes generally equal to the first temperature T1 of the fuel cell 10.

Immediately after the start-up of the fuel cell system 100, a temperature difference $\Delta T$ between the first temperature T1 of the fuel cell 10 and the second temperature T2 of the circulation pump 64 is generally zero because both the first temperature T1 and the second temperature T2 are generally equal to outside air temperature. Thereafter, as the first temperature T1 starts to increase, the temperature difference $\Delta T$ between the first temperature T1 and the second temperature T2 increases. At time t1, the second temperature T2 increases behind the first temperature T1. Thereafter, even though the first temperature T1 comes not to increase any more, the second temperature T2 increases until getting generally equal to the first temperature T1. During this period, the temperature difference $\Delta T$ between the first temperature T1 and the second temperature T2 decreases, finally resulting in generally zero. That is, the temperature difference $\Delta T$ between the first temperature T1 of the fuel cell 10 and the second temperature T2 of the circulation pump 64 increases from zero after start-up of the fuel cell system 100, and thereafter decreases to zero. In addition, during the period from time t1 to t2, it can occur, depending on the heating value of the fuel cell 10 and heat capacity of the circulation pump 64, that (a) the temperature difference $\Delta T$ between the first temperature T1 and the second temperature T2 is generally constant, (b) $\Delta T$ increases, and (c) $\Delta T$ decreases. Referring to FIG. 3, time t3 is a time at which warming-up operation is ended. For example, the warming-up operation is ended when the first temperature T1 of the fuel cell 10 has become generally constant and moreover the second temperature T2 has come to a predetermined temperature or more. In addition, ending of the warming-up operation may depend on other conditions.

Figure 4:
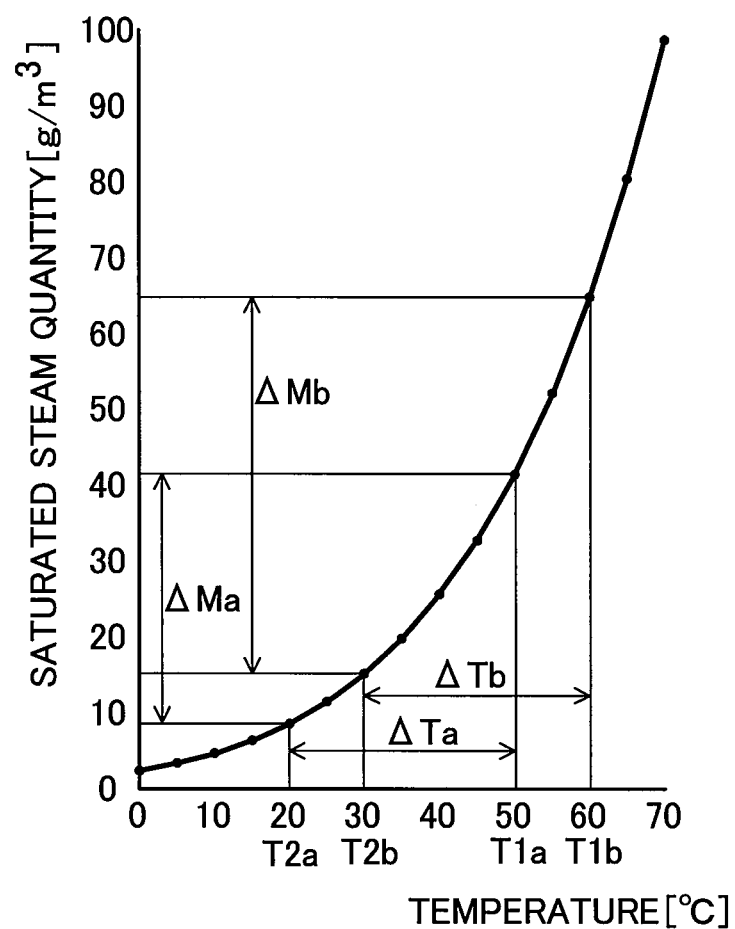
FIG. 4 is a graph showing a relationship between temperature and saturated steam quantity.

FIG. 4 is a graph showing a relationship between temperature and saturated steam quantity. The saturated steam quantity is expressed by a mass of steam that can exist in a space of 1 m$^3$ in the unit of (g). In addition, the saturated steam quantity is proportional to the saturated steam pressure. The higher the temperature is, the larger the saturated steam quantity becomes. As the temperature of a gas containing saturated-state steam decreases more and more, steam that can no longer be contained in the gas condenses. In this connection, in a case where the temperature of the gas containing saturated-state steam has decreased to an equal decrement, the higher the temperature preceding the decrease is, the larger the quantity of water condenses. FIG. 4 charts, as an example, a case in which T1a (50° C.) has decreased to T2a (20° C.), with a decrement of $\Delta Ta$ (=30° C.) and with condensed water of $\Delta Ma$ generated, and another case in which T1b (60° C.) has decreased to T2b (30° C.), with a decrement of $\Delta Tb$ (=30° C.) and with condensed water of $\Delta Mb$ generated. In comparison of these cases, indeed the temperature variations $\Delta Ta$, $\Delta Tb$ involved in the temperature decreases are 30° C. equally in both cases, but their quantities of condensed water that condenses in these cases are such that $\Delta Ma$ ($\approx$33 g) <$\Delta Mb$ ($\approx$50 g), proving that the quantity of condensed water is larger in the decrease from T1$b$ (60° C.) to T2$b$ (30° C.) than in the decrease from T1$a$ (50° C.) to T2$a$ (20° C.). Even with an equal temperature variation between temperature decreases, the condensed water quantity differs depending on which temperature the temperature decrease starts with. In addition, since there are cases where an actual steam pressure of the anode offgas has not reached the saturated steam pressure, a difference between saturated steam quantities represents a maximum quantity of condensed water.

Figure 5:
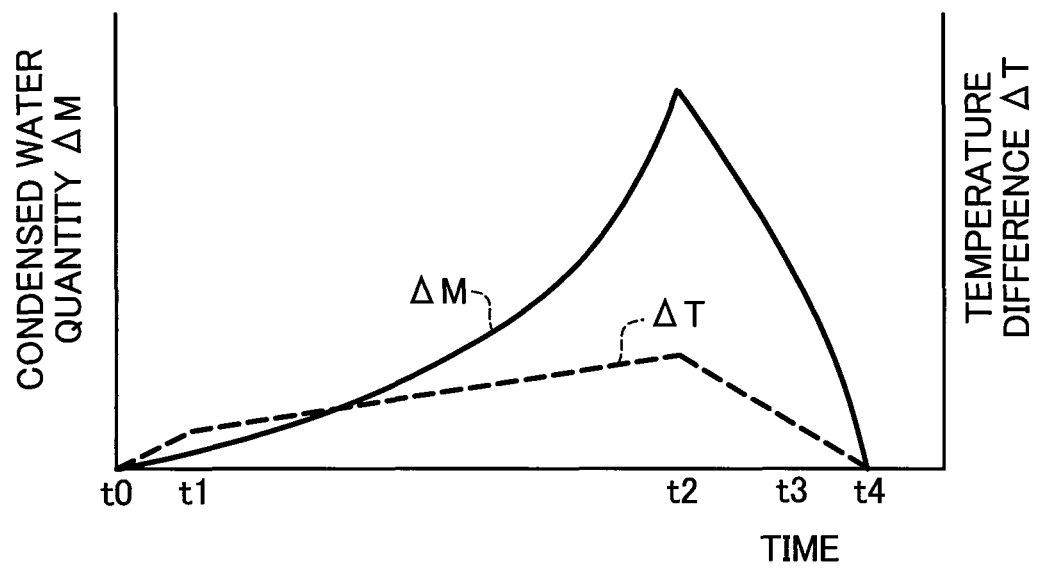
FIG. 5 is an explanatory view showing time variations in temperature difference between the first temperature of the fuel cell and the second temperature of the circulation pump after start-up of the fuel cell system as well as in generated condensed water quantity.

FIG. 5 is an explanatory view showing time variations in temperature difference Δt between the first temperature T1 of the fuel cell 10 and the second temperature T2 of the circulation pump 64 after start-up of the fuel cell system 100 as well as in generated condensed water quantity ΔM. The temperature difference ΔT between the first temperature T1 of the fuel cell 10 and the second temperature T2 of the circulation pump 64, as described above, increases from 0° C. after the start-up of the fuel cell system 100, comes to a maximum at time t2, and thereafter decreases to 0° C. The generated condensed water quantity ΔM also comes to a maximum at time t2, thereafter decreases, and comes to zero at time t4 when the temperature difference ΔT comes to zero. In addition, as shown in FIG. 4, the higher the temperature is, the larger the quantity of condensed water relative to temperature differences becomes, so that the quantity of generated condensed water abruptly increases as the time t2 becomes nearer, and the quantity of generated condensed water abruptly decreases as the time t4 becomes nearer.

Figure 6:
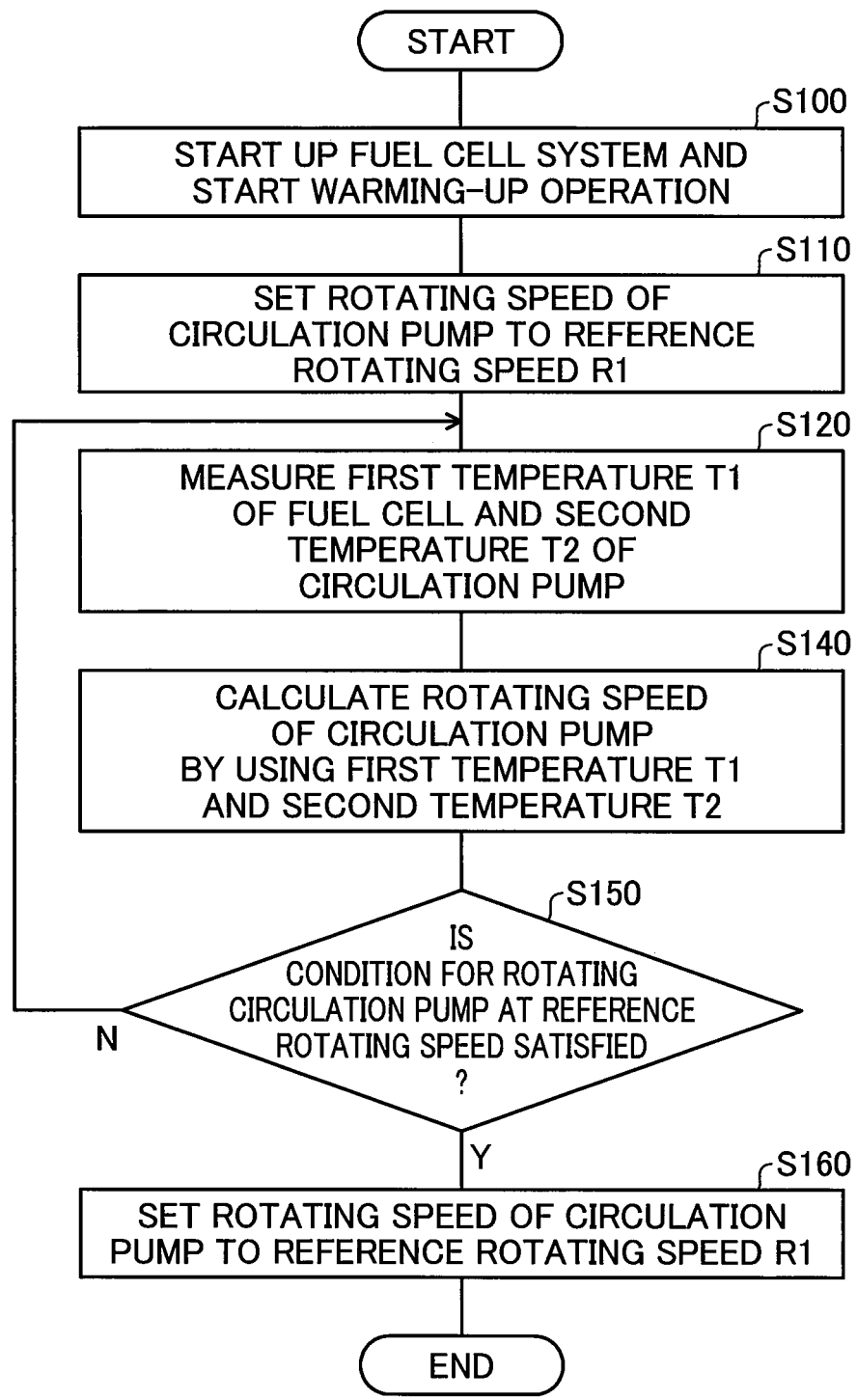
FIG. 6 is a control flowchart of the first embodiment.

FIG. 6 is a control flowchart of the first embodiment. When the fuel cell system 100 is started up at step S100, the controller 20 starts warming-up operation. The term, warming-up operation, refers to operation for intentionally increasing heat loss to thereby rapidly warm up the fuel cell 10. The warming-up operation may be implemented by throttling the supply amount of cathode gas to the fuel cell 10, as compared with e.g. normal operation. At step S110, the controller 20 sets the rotating speed of the circulation pump 64 to a reference rotating speed R1. As the circulation pump 64 is rotated, there occurs drive noise. Higher rotating speeds cause the drive noise to be more noticeable. The reference rotating speed R1 is a rotating speed that allows drive noise caused by the circulation pump 64 to be less noticeable after the start-up of the fuel cell system 100.

Thereafter, at step S120, the controller 20 acquires a first temperature T1 of the fuel cell 10 and a second temperature T2 of the circulation pump 64. At step S140, the controller 20 sets the rotating speed R of the circulation pump 64 by using the first temperature T1 and the second temperature T2, and makes the circulation pump 64 rotated at the set rotating speed. The relationship between the first temperature T1 as well as the second temperature T2 and the rotating speed R of the circulation pump 64 has been determined preparatorily by experiments or the like and has been stored in the controller 20 in the form of, e.g., look-up table or map. The rotating speed R of the circulation pump 64 is: (a) becomes higher and higher than the reference rotating speed R1 with increasing temperature difference ΔT between the first temperature T1 and the second temperature T2 under the condition that the first temperature T1 (or second temperature T2) keeps generally equal; and, (b) becomes higher and higher than the reference rotating speed R1 with increasing first temperature T1 (or second temperature T2) under the condition that the temperature difference between the first temperature T1 and the second temperature T2 keeps generally equal.

At step S150, the controller 20 decides whether or not a condition for rotating the circulation pump 64 at the reference rotating speed is satisfied. The condition for rotating the circulation pump 64 at the reference rotating speed is, for example, (a) in which the first temperature T1 of the fuel cell 10 is a predetermined temperature or more and moreover in which the difference between the first temperature T1 of the fuel cell 10 and the second temperature T2 of the circulation pump 64 is a predetermined temperature or less, or (b) in which the second temperature T2 of the circulation pump 64 is a predetermined temperature or more. However, the condition for rotating the circulation pump 64 at the reference rotating speed may be other than these conditions. When the condition for rotating the circulation pump 64 at the reference rotating speed is satisfied, the controller 20, moving on to step S160, rotates the circulation pump 64 at the reference rotating speed R1. Thereafter, the vehicle on which the fuel cell system 100 is mounted turns into a traveling state. In this case, when the generated power quantity of the fuel cell 10 has increased, the controller 20 makes the rotating speed of the circulation pump 64 increased in response to the generated power quantity of the fuel cell 10. Under the traveling state, noise due to the rotation of the circulation pump 64 becomes less noticeable due to traveling sounds. When the condition for rotating the circulation pump 64 at the reference rotating speed is not satisfied, the controller 20, returning to step S120, repeats similar steps (processing).

The generation quantity ΔM of condensed water increases more and more with increasing temperature difference ΔT between the first temperature T1 of the fuel cell 10 and the second temperature T2 of the circulation pump 64. According to the first embodiment, the controller 20 sets the rotating speed of the circulation pump 64 to the reference rotating speed R1. Then, in the case where the first temperature T1 and the second temperature T2 are not generally equal to each other, given that the first temperature T1 keeps generally equal, the controller 20 sets the rotating speed R of the circulation pump 64 in such fashion that the rotating speed becomes higher and higher than the reference rotating speed R1 with increasing temperature difference ΔT between the first temperature T1 and the second temperature T2. Thus, the controller 20 rotates the circulation pump 64 at the set rotating speed. Accordingly, when the generation quantity ΔM of condensed water is decided to be large, the rotating speed R of the circulation pump may be increased so that water may be easily discharged before generation of condensed water. In another way, the rotating speed R of the circulation pump 64 may be so set that given a generally equal temperature difference ΔT, the rotating speed becomes higher and higher than the reference rotating speed R1 with increasing first temperature T1, and the circulation pump 64 may be rotated at the set rotating speed. Similarly, when the generation quantity ΔM of condensed water is decided to be large, the rotating speed R of the circulation pump may be increased so that water may be easily drained before generation of condensed water.

B. Second Embodiment

In the first embodiment, the controller 20 acquires the first temperature T1 of the fuel cell 10 and the second temperature T2 of the circulation pump 64, and sets the rotating speed R of the circulation pump 64 by using the first temperature T1 and the second temperature T2, so that the circulation pump 64 is rotated at the set rotating speed. In contrast to this, in the second embodiment, the controller 20 calculates a difference ΔW between a saturated steam quantity at the first temperature T1 and a saturated steam quantity at the second temperature T2 by using the first temperature T1 and the second temperature T2, and calculates an additional rotating speed ΔR for the circulation pump 64 from the saturated-steam-quantity difference ΔW, so that the circulation pump 64 is rotated at a rotating speed (R1+ΔR1).

Figure 7:
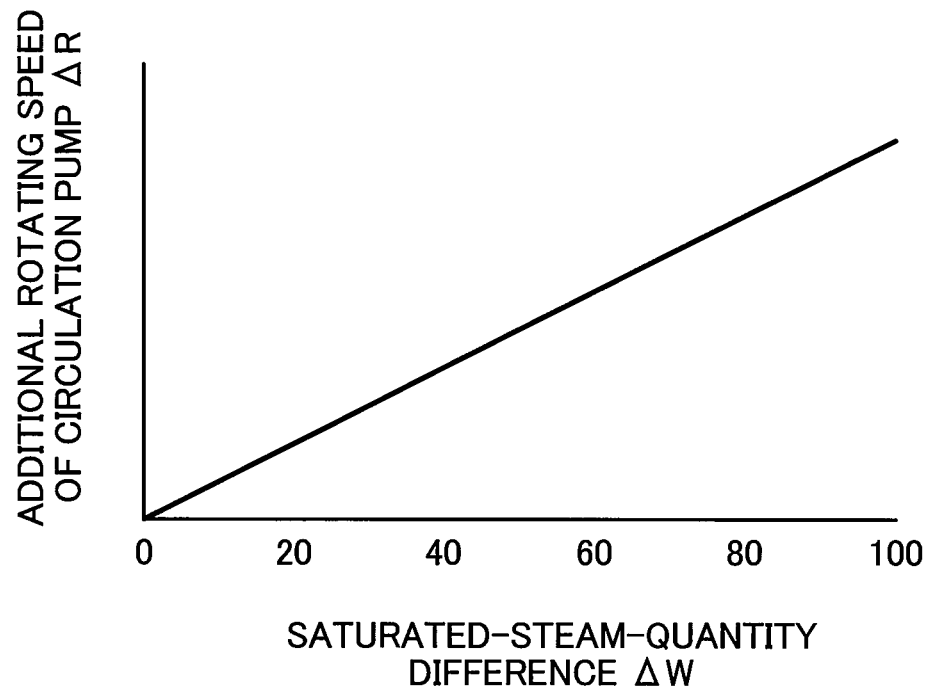
FIG. 7 is a graph showing a relationship between the difference between a saturated steam quantity at the first temperature and a saturated steam quantity at the second temperature, and the additional rotating speed for the circulation pump corresponding to the saturated-steam-quantity difference.

FIG. 7 is a graph showing a relationship between the difference ΔW between a saturated steam quantity at the first temperature and a saturated steam quantity at the second temperature, and the additional rotating speed ΔR for the circulation pump 64 corresponding to the saturated-steam-quantity difference ΔW. The saturated-steam-quantity difference ΔW and the additional rotating speed ΔR are generally proportional to each other. In this case, the rotating speed of the circulation pump 64 may be increased in response to the saturated-steam-quantity difference ΔW. However, the saturated-steam-quantity difference ΔW and the additional rotating speed ΔR may have such a curvilinear relationship that the additional rotating speed ΔR increases more and more with increasing saturated-steam-quantity difference ΔW.

Figure 8:
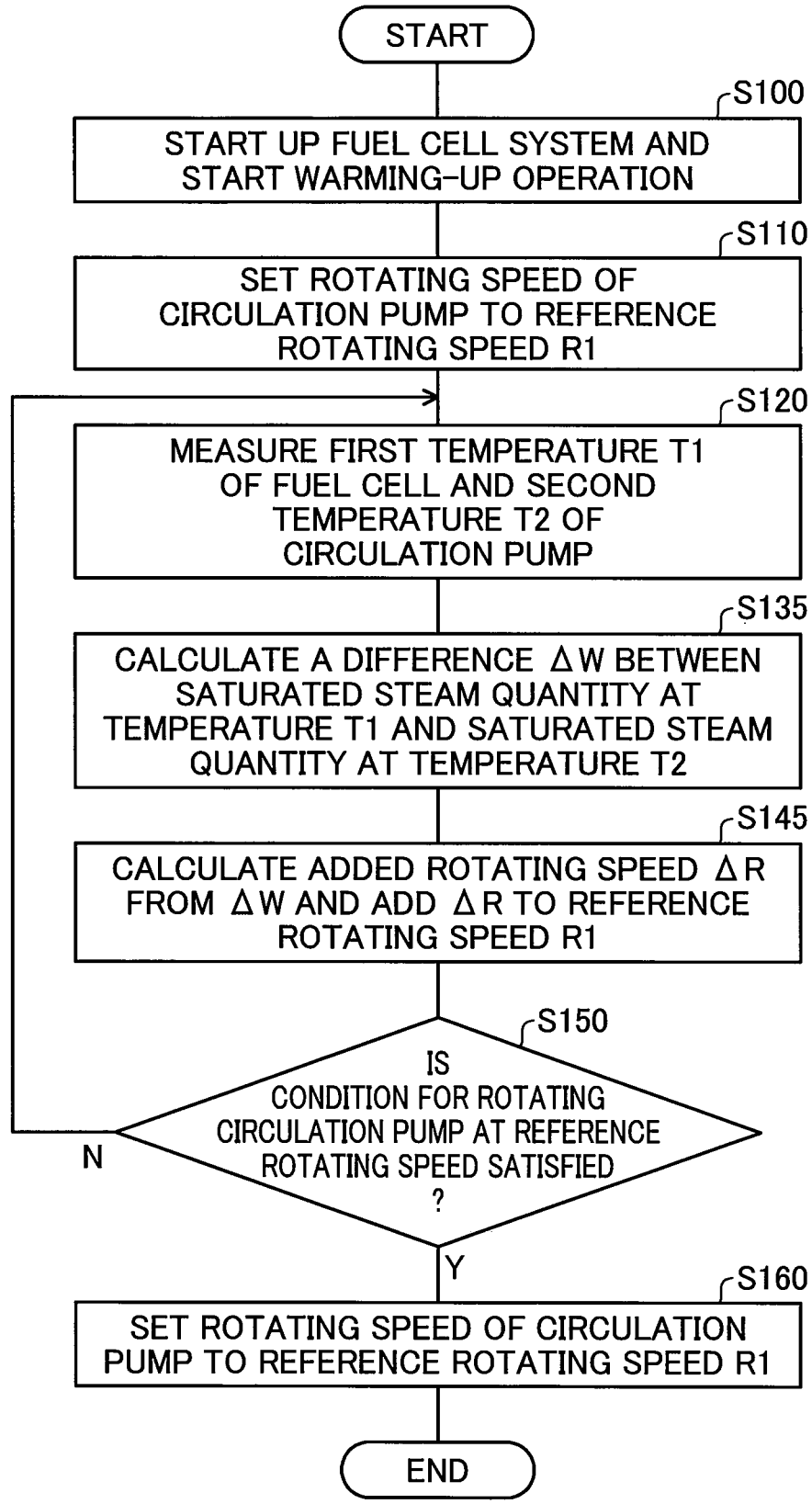
FIG. 8 is a control flowchart of the second embodiment.

FIG. 8 is a control flowchart of the second embodiment. In comparison with the control flowchart of the first embodiment shown in FIG. 6, step S140 is not included, but instead steps S135, S145 are included. At step S135, the controller 20 calculates a difference ΔW between a saturated steam quantity at the first temperature T1 and a saturated steam quantity at the second temperature T2. At step S145, the additional rotating speed ΔR is calculated from the saturated-steam-quantity difference ΔW by using the graph of FIG. 7, and the circulation pump 64 is rotated at a rotating speed (R1+ΔR1).

As described above, according to the second embodiment, when the fuel cell system 100 is started up and thrown into warming-up operation, the controller 20 controls the rotating speed of the circulation pump 64 in such fashion that the rotating speed is increased from the predetermined reference rotating speed R1 to an extent of the additional rotating speed ΔR corresponding to the saturated-steam-quantity difference ΔW. The quantity of steam contained in actual anode offgas is not more than the saturated steam quantity. Therefore, the quantity of condensed water to be generated in actual condensation of steam contained in the anode offgas is not more than the saturated-steam-quantity difference ΔW. Thus, by calculating the additional rotating speed ΔR of the circulation pump 64 on the basis of the saturated-steam-quantity difference ΔW, and by rotating the circulation pump 64 at the rotating speed (R1+ΔR1), water and steam may be discharged before accumulation of water in the circulation pump 64, more reliably than in the first embodiment. As a consequence, unusual noise is made less likely to occur within the circulation pump 64.

In the second embodiment, a graph is used which shows a relationship between saturated-steam-quantity differences ΔW and additional rotating speeds ΔR of the circulation pump 64 corresponding to the saturated-steam-quantity differences ΔW. However, another graph may also be used which shows a relationship between saturated-steam-quantity differences ΔW and rotating speeds (R1+ΔR1) of the circulation pump 64 corresponding to the saturated-steam-quantity differences ΔW.

C. Third Embodiment

In the first embodiment, the controller 20 acquires the first temperature T1 of the fuel cell 10 and the second temperature T2 of the circulation pump 64, then sets a rotating speed R of the circulation pump 64 by using the first temperature T1 and the second temperature T2, and makes the circulation pump 64 rotated at the set rotating speed. In the third embodiment, the controller 20 prepares a determined transition pattern for the rotating speed of the circulation pump 64 based on at least one of the first temperature T1 of the fuel cell 10 and the second temperature T2 of the circulation pump 64, and then controls the rotating speed of the circulation pump 64 on the basis of the transition pattern.

Figure 9:
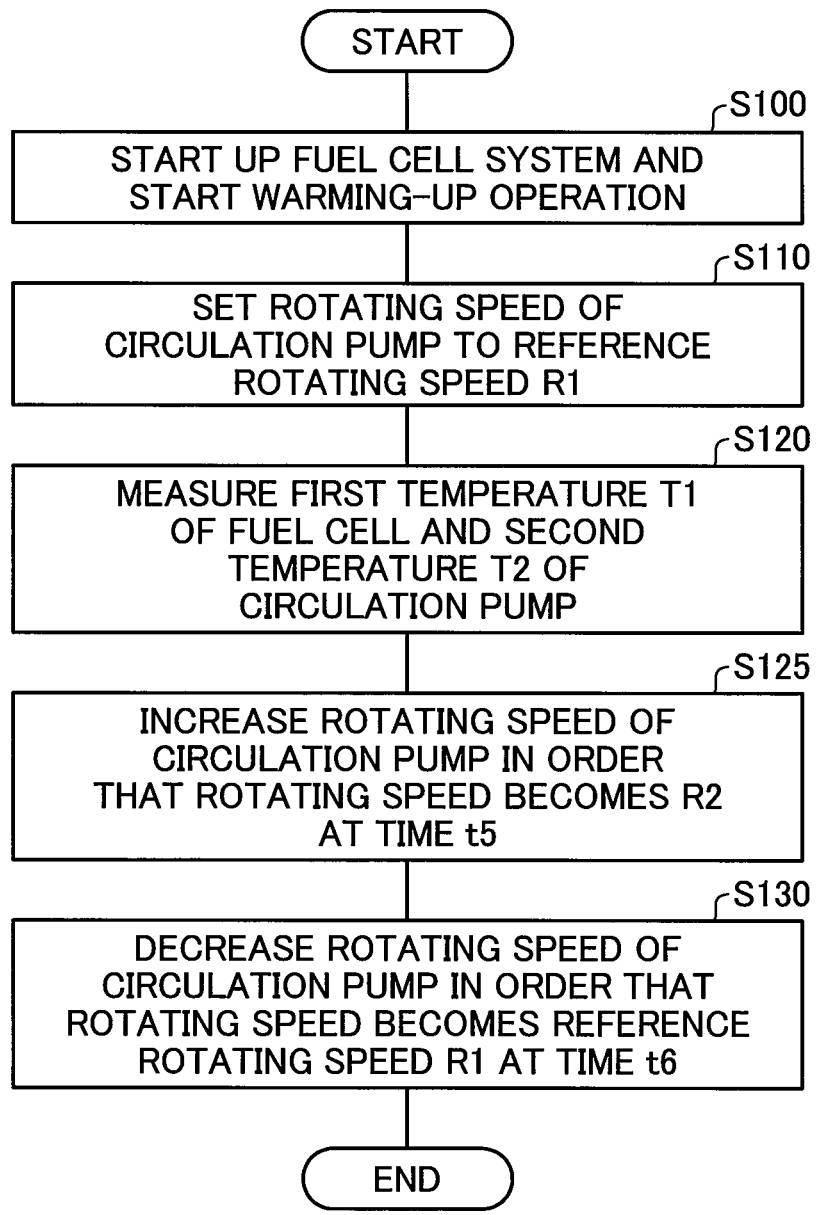
FIG. 9 is a control flowchart of the third embodiment.

FIG. 9 is a control flowchart of the third embodiment. As to its difference, steps S140, S150 are not included, but instead steps S125, S130 are included. At step S120, the controller 20 measures at least one of the first temperature T1 of the fuel cell 10 and the second temperature T2 of the circulation pump 64. At step S125, in order that at time t5, the rotating speed of the circulation pump 64 comes to a rotating speed R2 higher than the reference rotating speed R1, the controller 20 increases the rotating speed of the circulation pump 64 in accordance with a transition pattern of the rotating speed of the circulation pump 64. At step S130, in order that at time t6, the rotating speed of the circulation pump 64 comes to R1, the controller 20 decreases the rotating speed of the circulation pump 64 in accordance with another transition pattern of the rotating speed of the circulation pump 64. For these transition patterns, a plurality of transition patterns are prepared on the basis of first temperatures T1 of the fuel cell 10 and second temperatures T2 of the circulation pump 64 at the start-up of the fuel cell system 100. Then, a transition pattern is selected on the basis of at least one of measured values of the first temperature T1 of the fuel cell 10 and the second temperature T2 of the circulation pump 64.

Figure 10:
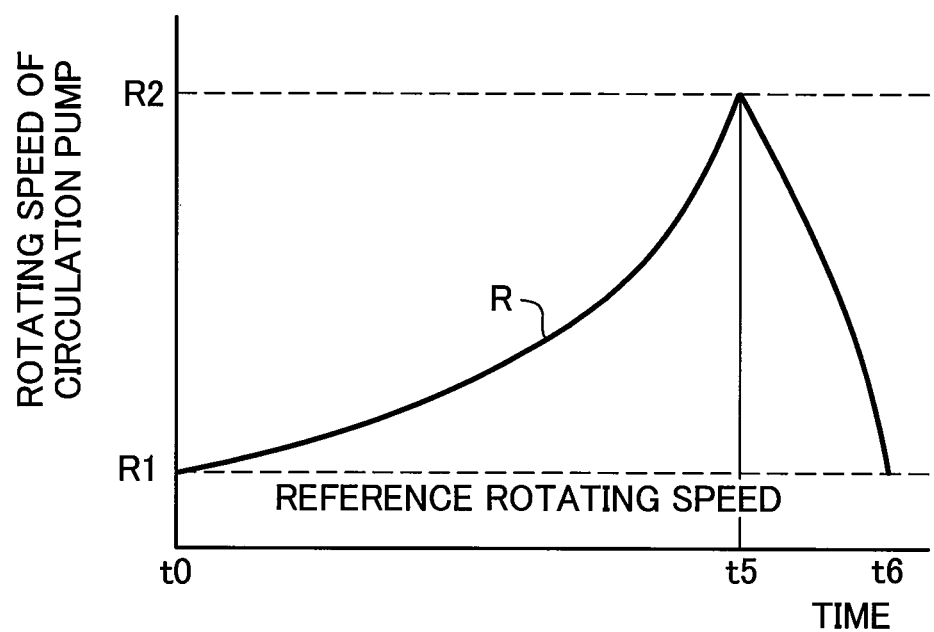
FIG. 10 is a graph showing a transition pattern of the rotating speed of the circulation pump.

FIG. 10 is a graph showing a transition pattern of the rotating speed of the circulation pump 64 in steps S125, S130. Part of this transition pattern above the reference rotating speed R1 is similar in shape to the pattern of condensed water quantity in FIG. 5. In addition, time t5 of FIG. 10 may be other than coincident with time t2 of FIG. 5, and time t6 of FIG. 10 may be other than coincident with time t4 of FIG. 5. However, it is preferable that time t5 be generally coincident with time t2 while time t6 be generally coincident with time t4. For example, the transition patterns for the rotating speed may be determined by experiments in such fashion that time t5 becomes generally coincident with time t2 while time t6 becomes generally coincident with time t4. Like this, the transition patterns for the rotating speed of the circulation pump 64 in the third embodiment are preferably prepared from experimental results which are acquired by experiments as to how the rotating speed of the circulation pump 64 has transitionally varied in the first embodiment or the second embodiment. Therefore, the transition pattern of the rotating speed of the circulation pump 64 results in a pattern generally conformable to that of the quantity of generated condensed water. Thus, it becomes implementable to discharge water at high rotating speed before a large quantity of water is accumulated in the circulation pump 64, and to make unusual noise less likely to occur.

In addition, generation quantity of condensed water may differ depending on the first temperature T1 of the fuel cell 10 or the second temperature T2 of the circulation pump 64 at the start-up of the fuel cell system 100. For this reason, the controller 20 holds, as the transition pattern of the rotating speed of the circulation pump 64, a plurality of transition patterns corresponding to at least one of the first temperatures T1 of the fuel cell 10 and the second temperatures T2 of the circulation pump 64 at the start-up of the fuel cell system 100.

D. Other Embodiments

(1) Other Embodiment 1

In the foregoing embodiments, a temperature of the refrigerant discharged from the fuel cell 10 is measured as the first temperature T1 of the fuel cell 10. However, it is the temperature of anode offgas that has connection with condensation. Accordingly, a temperature sensor for measuring the temperature of the anode offgas may be provided, and a measured value of the temperature sensor may be used as the first temperature T1 of the fuel cell 10.

(2) Other Embodiment 2

The foregoing embodiments have been described on a case where the controller 20 is implemented by using a microcomputer in such a software-like configuration that software corresponding to various types of control is executed to implement an overall controller, a cathode gas controller for controlling the cathode gas supply system 30 and the cathode gas discharge system 40, an anode gas controller for controlling the anode gas supply system 50 and the anode gas circulation system 60, a refrigerant controller for controlling the refrigerant circulation system 70, and the like. However, the controller 20 may also be implemented in such a hardware-like configuration that various controllers such as the cathode controller as well as the anode controller and the refrigerant controller are implemented by exclusive-use processing circuits, respectively.

The present invention is not limited to the above-described embodiments and other embodiments, and may be changed and modified in various ways unless those changes and modifications depart from the gist of the invention. For example, technical features in the embodiments and other embodiments corresponding to technical features in the individual aspects described in the section of Summary of the Invention may be replaced or combined with one another, as required, in order to solve part or entirety of the above-described problems or to achieve part or entirety of the above-described advantageous effects. Moreover, those technical features may be deleted, as required, unless herein otherwise described as indispensable.

The present invention, having been accomplished to solve the above-described problems, may be implemented in the following aspects.

According to one aspect of the disclosure, there is provided a fuel cell system. The fuel cell system comprises; a fuel cell; an anode gas supply flow path for supplying anode gas to the fuel cell; an anode gas discharge flow path for discharging anode offgas from the fuel cell; an anode gas circulation flow path for connecting the anode gas supply flow path and the anode gas discharge flow path to each other; a circulation pump provided on the anode gas circulation flow path to supply the anode offgas to the anode gas supply flow path; a first temperature sensor for measuring a temperature of the fuel cell as a first temperature; a second temperature sensor for measuring a temperature of the circulation pump as a second temperature; and a controller for controlling various devices of the fuel cell system. The controller is configured, when the fuel cell system is started up and thrown into warming-up operation, to set a rotating speed of the circulation pump to a reference rotating speed, subsequently repeatedly performs: (a) a process of acquiring the first temperature and the second temperature; and (b) a process of controlling the circulation pump by setting the rotating speed of the circulation pump in order that with the first temperature is within a predetermined temperature range, the rotating speed is made generally higher than the reference rotating speed with increasing temperature difference between the first temperature and the second temperature, and when a condition for rotating the circulation pump at the reference rotating speed is satisfied, to set the rotating speed of the circulation pump to the reference rotating speed.

When the fuel cell system is started up and thrown into warming-up operation, the fuel cell is warmed and anode offgas temperature is increased. The anode offgas, having reached the circulation pump, is cooled by the circulation pump so as to be condensed. Meanwhile, the circulation pump is warmed and increased in temperature by the anode offgas. Finally, the temperature of the anode offgas and the temperature of the circulation pump become generally equal to each other, causing no more condensations to occur in the circulation pump. Therefore, as the temperature of the anode offgas increases, the quantity of condensed water generated in the circulation pump increases. Thereafter, as the temperature of the circulation pump increases, temperature difference between the anode-offgas temperature and the circulation-pump temperature in turn decreases, so that the quantity of generated condensed water decreases. In this case, the quantity of generated condensed water becomes larger and larger with increasing temperature difference between a first temperature and a second temperature.

According to this aspect, when the fuel cell system is started up and thrown into warming-up operation, the rotating speed of the circulation pump is set to the reference rotating speed. Thereafter, the following processes are repeatedly executed, i.e., (a) a process of acquiring the first temperature and the second temperature; and (b) a process of controlling the circulation pump by setting the rotating speed of the circulation pump in order that with the first temperature is within a predetermined temperature range, the rotating speed is made generally higher than the reference rotating speed with increasing temperature difference between the first temperature and the second temperature. Thus, before a large quantity of condensed water is accumulated in the circulation pump, the circulation pump can be rotated at high rotating speed, water and steam can be discharged, and unusual noise can be made less likely to occur.

The fuel cell system according with the above aspect; wherein in the process (b), the controller may further control the circulation pump by setting the rotating speed of the circulation pump in order that with the temperature difference is within a predetermined temperature range, the rotating speed is made generally higher than the reference rotating speed with increasing first temperature.

According to this aspect, with the temperature difference is within a predetermined temperature range, the rotating speed of the circulation pump is set in order that the rotating speed is made generally higher than the reference rotating speed with increasing first temperature. Thus, before a large quantity of condensed water is accumulated in the circulation pump, the circulation pump can be rotated at high rotating speed, water and steam can be discharged, and unusual noise can be made less likely to occur.

The fuel cell system according with the above aspect; wherein in the process (b), the controller may perform: (b-1) a process of calculating a saturated-steam-quantity difference between a saturated steam quantity at the first temperature and a saturated steam quantity at the second temperature by using a temperature versus saturated steam quantity relationship; and (b-2) a process of controlling the rotating speed of the circulation pump in order that the rotating speed of the circulation pump becomes higher and higher with increasing saturated-steam-quantity difference.

The quantity of condensed water generated upon actual condensations of steam is not more than the saturated-steam-quantity difference. According to this aspect, since the rotating speed of the circulation pump is controlled on the basis of the saturated-steam-quantity difference, the circulation pump can be rotated at high rotating speed and moreover water and steam can be discharged before water is accumulated in the circulation pump.

According to another aspect of the disclosure, there is provided a fuel cell system. The fuel cell system comprises: a fuel cell; an anode gas supply flow path for supplying anode gas to the fuel cell; an anode gas discharge flow path for discharging anode offgas from the fuel cell; an anode gas circulation flow path for connecting the anode gas supply flow path and the anode gas discharge flow path to each other; a circulation pump provided on the anode gas circulation flow path to supply the anode offgas to the anode gas supply flow path; a temperature sensor for measuring at least one of a temperature of the fuel cell and a temperature of the circulation pump; and a controller for controlling various devices of the fuel cell system. The controller is configured, when the fuel cell system is started up and thrown into warming-up operation, to control a rotating speed of the circulation pump in accordance with a transition pattern of the rotating speed of the circulation pump which is predetermined based on temperatures measured by the temperature sensor, and the transition pattern is a pattern which is defined on an assumptive basis of temperature transitions of the fuel cell and the circulation pump during the warming-up operation of the fuel cell and in which the rotating speed of the circulation pump is once increased from the reference rotating speed and thereafter decreased to the reference rotating speed.

According to this aspect, when the fuel cell system is started up and thrown into warming-up operation, the controller controls the rotating speed of the circulation pump in accordance with a transition pattern of the rotating speed of the circulation pump which is predetermined based on temperatures measured by the temperature sensor, and the transition pattern is a pattern which is defined on an assumptive basis of temperature transitions of the fuel cell and the circulation pump during the warming-up operation of the fuel cell and in which the rotating speed of the circulation pump is once increased from the reference rotating speed and thereafter decreased to the reference rotating speed. Thus, before a large quantity of water is accumulated in the circulation pump, the circulation pump can be rotated at high rotating speed, water and steam in the anode offgas can be discharged, and unusual noise can be made less likely to occur.

The present invention may be implemented in various modes, and for example, implemented in such various forms as fuel cell system, fuel cell system control method, and the like.

What is claimed is:

1. A fuel cell system comprising:
a fuel cell;
an anode gas supply flow path for supplying anode gas to the fuel cell;
an anode gas discharge flow path for discharging anode offgas from the fuel cell;
an anode gas circulation flow path for connecting the anode gas supply flow path and the anode gas discharge flow path to each other;
a circulation pump provided on the anode gas circulation flow path to supply the anode offgas to the anode gas supply flow path;
a first temperature sensor for measuring a temperature of the fuel cell as a first temperature;
a second temperature sensor for measuring a temperature of the circulation pump as a second temperature; and
a controller for controlling various devices of the fuel cell system, wherein the controller is configured, when the fuel cell system is started up and thrown into warming-up operation, to set a rotating speed of the circulation pump to a reference rotating speed, subsequently repeatedly to perform:
(a) a process of acquiring the first temperature and the second temperature; and
(b) a process of controlling the circulation pump by setting the rotating speed of the circulation pump in order that with the first temperature is within a predetermined temperature range, the rotating speed is made generally higher than the reference rotating speed with increasing temperature difference between the first temperature and the second temperature, and when a condition for rotating the circulation pump at the reference rotating speed is satisfied, to set the rotating speed of the circulation pump to the reference rotating speed.

2. The fuel cell system in accordance with claim 1, wherein
in the process (b), the controller further controls the circulation pump by setting the rotating speed of the circulation pump in order that with the temperature difference is within a predetermined temperature range, the rotating speed is made higher than the reference rotating speed with increasing first temperature.

3. The fuel cell system in accordance with claim 1, wherein
in the process (b), the controller performs:
(b-1) a process of calculating a saturated-steam-quantity difference between a saturated steam quantity at the first temperature and a saturated steam quantity at the second temperature by using a temperature versus saturated steam quantity relationship; and
(b-2) a process of controlling the rotating speed of the circulation pump in order that the rotating speed of the circulation pump becomes higher and higher with increasing saturated-steam-quantity difference.

4. The fuel cell system in accordance with claim 2, wherein
in the process (b), the controller performs:
(b-1) a process of calculating a saturated-steam-quantity difference between a saturated steam quantity at the first temperature and a saturated steam quantity at the second temperature by using a temperature versus saturated steam quantity relationship; and
(b-2) a process of controlling the rotating speed of the circulation pump in order that the rotating speed of the circulation pump becomes higher and higher with increasing saturated-steam-quantity difference.

5. A control method for a fuel cell system which comprises: a fuel cell; an anode gas supply flow path for supplying anode gas to the fuel cell; an anode gas discharge flow path for discharging anode offgas from the fuel cell; an anode gas circulation flow path for connecting the anode gas supply flow path and the anode gas discharge flow path to each other; a circulation pump provided on the anode gas circulation flow path to supply the anode offgas to the anode gas supply flow path, the method comprising:

when the fuel cell system is started up and thrown into warming-up operation, setting a rotating speed of the circulation pump to a reference rotating speed;

thereafter repeatedly performing:
(a) a process of acquiring a first temperature which is a temperature of the fuel cell and a second temperature which is a temperature of the circulation pump; and
(b) a process of controlling the circulation pump by setting the rotating speed of the circulation pump in order that with the first temperature is within a predetermined temperature range, the rotating speed is made generally higher than the reference rotating speed with increasing temperature difference between the first temperature and the second temperature, and when a condition for rotating the circulation pump at the reference rotating speed is satisfied, setting the rotating speed of the circulation pump to the reference rotating speed.

6. The fuel cell system control method in accordance with claim 5, further comprising
in the process (b), controlling the circulation pump by setting the rotating speed of the circulation pump in order that with the temperature difference is within a predetermined temperature range, the rotating speed is made generally higher than the reference rotating speed with increasing first temperature.

7. The fuel cell system control method in accordance with claim 5, further comprising:
in the process (b),
(b-1) calculating a saturated-steam-quantity difference between a saturated steam quantity at the first temperature and a saturated steam quantity at the second temperature by using a temperature versus saturated steam quantity relationship; and
(b-2) controlling the rotating speed of the circulation pump in order that the rotating speed of the circulation pump becomes higher and higher with increasing the saturated-steam-quantity difference.

8. The fuel cell system control method in accordance with claim 6, further comprising:
in the process (b),
(b-1) calculating a saturated-steam-quantity difference between a saturated steam quantity at the first temperature and a saturated steam quantity at the second temperature by using a temperature versus saturated steam quantity relationship; and
(b-2) controlling the rotating speed of the circulation pump in order that the rotating speed of the circulation pump becomes higher and higher with increasing the saturated-steam-quantity difference.

* * * * *